Feb. 4, 1941.　　　A. F. ANDERSON　　　2,230,790
NUT CRACKING MACHINE
Filed Nov. 1, 1938　　　2 Sheets-Sheet 1

WITNESSES
Geo. W. Naylor
D. H. Kane

INVENTOR
Arthur Francis Anderson
BY
Munn, Anderson & Liddy
ATTORNEYS

Feb. 4, 1941. A. F. ANDERSON 2,230,790
NUT CRACKING MACHINE
Filed Nov. 1, 1938 2 Sheets-Sheet 2

WITNESSES
Geo. W. Naylor
W. H. Kane

INVENTOR
Arthur Francis Anderson
BY
Munn, Anderson & Liddy
ATTORNEYS

Patented Feb. 4, 1941

2,230,790

UNITED STATES PATENT OFFICE 2,230,790

NUT CRACKING MACHINE

Arthur Francis Anderson, Honolulu, Territory of Hawaii, assignor to Hawaiian Macadamia Nut Company, Limited, Honolulu, Territory of Hawaii, a corporation of the Territory of Hawaii Application November 1, 1938, Serial No. 238,178

2 Claims. (Cl. 146—11)

This invention relates to improvements in nut cracking machines and particularly to machines for cracking nuts having relatively hard shells.

Certain types of nuts, such as Macadamia nuts, are provided with relatively hard shells, and as a result it is difficult to manually crack the shells. Heretofore efforts have been made to produce machines for automatically and mechanically cracking the shells but none of the machines have been satisfactory. Thus, some of the machines have been very complicated and cumbersome and when subjected to commercial use in cracking the shells of Macadamia or similar nuts they break and require frequent repairs. Also it will be appreciated that it is desirable to extract the kernel from the nut in substantially unbroken condition and some of the machines in use not only break the shell but also the kernel of the nut.

It is a particular object of the present invention to overcome the difficulties heretofore encountered and to provide an improved nut cracking machine, particularly a machine for cracking Macadamia and similar nuts having hard shells, which will crack the shells and extract the kernels with a minimum amount of injury to the kernels, and which is of relatively simple construction and will operate over long periods of time with comparative freedom from wear and breakage.

For a fuller understanding of my invention reference should be had to the accompanying drawings, in which Figure 1 is a front elevation of a nut cracking machine embodying my invention;

Figure 1:
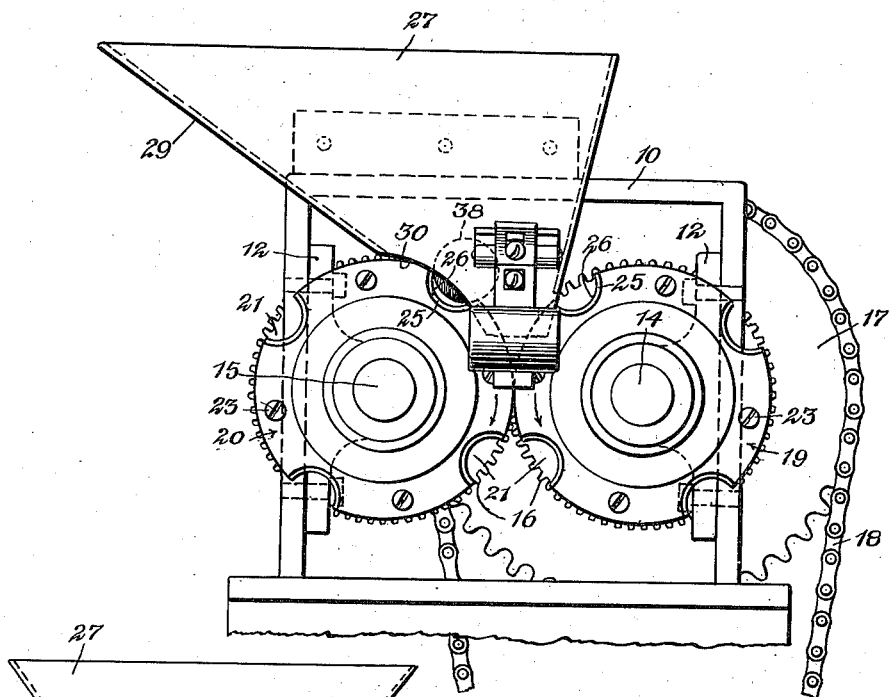
Figure 2:
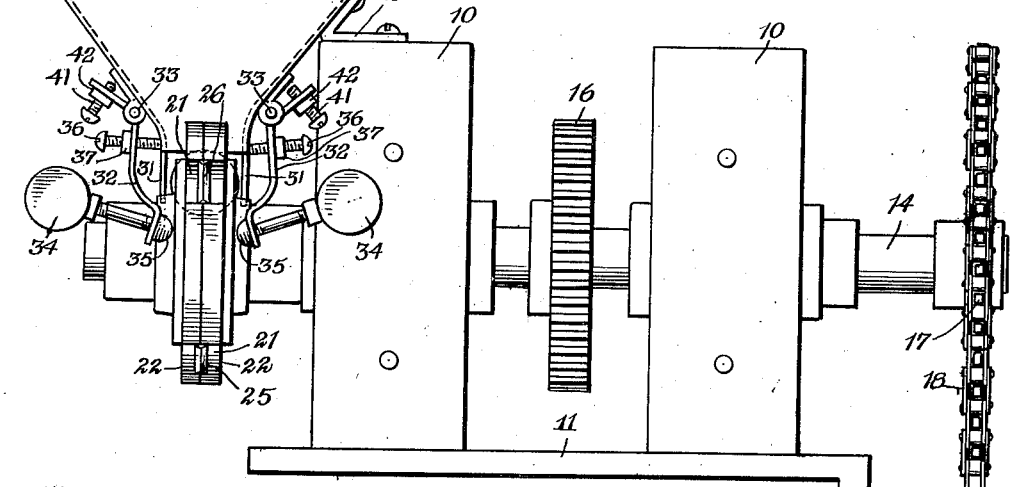
Fig. 2 is a side elevation of the machine.

My improved machine is preferably supported on a suitable frame such as the pair of inverted U-shaped brackets 10 which in turn are mounted upon a suitable base 11.

Suitably journaled in the members 12 which are supported on the brackets are the shafts 14 and 15 which are arranged in spaced parallel relationship and which are provided with a geared connection in the form of a pair of similar gears 16 (only one-half of which is shown), so that the shafts are adapted to rotate in opposite directions at the same rate of speed. One of the shafts, as for instance the shaft 14, is suitably connected to a driving mechanism as by means of the sprocket wheel 17 and sprocket chain 18, the latter being suitably connected to a motor, or the like.

Figure 6:
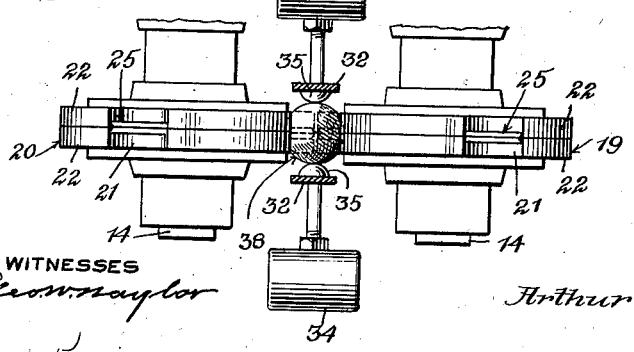
Fig. 6 is a plan view of the disks shown in the same position as in Fig. 3.

Fixedly mounted on the forward ends of the shafts so as to rotate therewith are the cutting disks 19 and 20 which as shown most clearly in Figs. 1 and 6 are positioned adjacent each other and with their respective transverse axes disposed in the same plane. Each of the disks is provided with a plurality of peripheral recesses preferably four in number, as indicated at 21, and the positions of the recesses and the rotation of the disks is synchronized so that the corresponding recesses on the respective disks will confront each other as shown most clearly in Fig. 4, once during each revolution of the disks.

Figure 3:
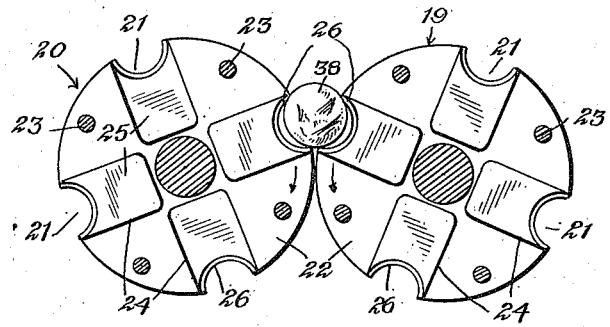
Fig. 3 is a front elevation of the nut cracking disks with the front plates removed and showing a nut in position just prior to being cracked.
Figure 4:
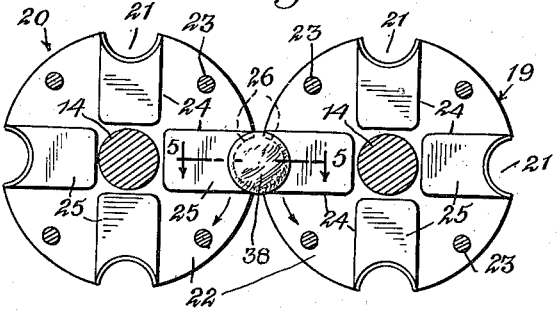
Fig. 4 is a similar view to Fig. 3 showing the nut in position while being cracked.
Figure 7:
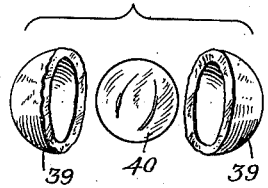
Fig. 7 is a view of a Macadamia nut showing the shell cracked open by the machine and with the kernel extracted in unbroken condition.

Since the shafts 14 and 15 are rotated at the same rate of speed it will be appreciated that the corresponding recesses in the disks approach the position of confronting relationship in the manner shown in Fig. 3, so that a nut may be positioned in the recesses. When the recesses reach a position of confronting relationship as shown in Fig. 4 the shell of the nut contained therein is cracked so that the kernel is extracted in the manner shown in Fig. 7. To accomplish this result each of the disks is preferably formed of a pair of similar, mating circular plates 22 fastened together in some suitable manner as by means of the screws or bolts 23. The confronting faces of the plates are provided with radial slots or grooves 24 extending inwardly from the recesses 21 and positioned in the radial grooves or slots 24 are the cutting knives 25 formed of suitable material such as tool steel and having recessed outer edges extending into the recesses 21 which may be formed to taper to a point as shown at 26. The cutting knives 25 are of such thickness that when the plates are assembled in the manner illustrated the knives will be held firmly in position.

Figure 5:
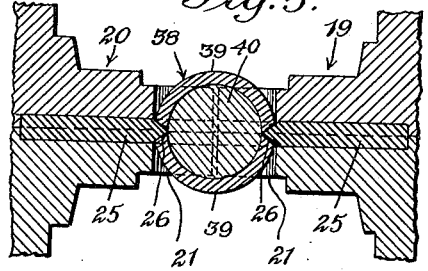
Fig. 5 is a cross-sectional view through the cracking disks, showing the manner in which the machine operates to crack the shell of a nut.

In using my improved nut cracking machine the cracking disks 19 and 20 are rotated in opposite directions by the mechanism heretofore described, preferably so that the disk 19 rotates in counter clockwise direction and the disk 20 rotates in clockwise direction as viewed in Figure 1. If a nut is placed in the recess 21 positioned adjacent the top of the disk 20, upon the continued rotation of the machine the nut will also be received in the corresponding recess of the disk 19 as shown in Fig. 3. Upon the further rotation of the machine the recesses will be positioned in confronting relationship as shown in Fig. 4 and the edges 26 of the knives 25 will project into the shell of the nut so as to split or crack the shell open in the manner shown in Fig. 7 so that the kernel is extracted in unbroken condition. So as to obtain satisfactory results nuts of graded size should be employed in the machine and the distance between the respective edges of the blades when the recesses are in confronting position should be approximately one-eighth inch less than the diameter of the nut. In this way the edges of the knives will enter the shell and split it in the manner shown in Figs. 5 and 7 without injuring the kernel. It will be accordingly appreciated that the spacing of the cracking disks will vary in proportion to the size of the nuts being cracked.

If it is desired, the nuts that are to be cracked may be manually placed in the recesses 21 of the disks. However, I prefer to feed the nuts to the disks by means of a hopper such as the hopper 27 supported above the disks on the forward bracket as by means of the angle iron 28. The hopper 27 preferably tapers from top to bottom in the manner illustrated and the lower end thereof leads downwardly between the disks. One side of the hopper indicated at 29 extends over the disk 20 and is provided with an arcuate feeding portion 30 which is open at the bottom and positioned adjacent the periphery of the disk 20 so that the nuts in the hopper are fed into the recesses of the disk 20 and thence fed around into engagement with the corresponding recesses of the disk 19.

I have found that it is sometimes necessary to center the nuts in the recesses so as to insure proper splitting of the shell and so as to prevent the nuts from escaping from the front or rear of the disk prior to being split open. To accomplish this result I extend the front and rear panels of the hopper downwardly for a short distance in the manner indicated at 31 so as to cover the front and rear faces of the disks. In addition to this I provide guide members in the form of the depending metal straps 32 which are hingedly mounted on the front and rear of the hopper as indicated at 33. The lower ends of the depending straps are provided with weights 34 so as to urge them downwardly towards the peripheries of the disks adjacent the point where the nuts are cracked. The faces of the straps 32 disposed towards the peripheries of the disks are provided with rounded projections 35 which under the weight of the members 34 engage the nuts and center them in the recesses. The position of the straps may be adjusted by means of the adjusting screws 36 threaded to the straps and adapted to engage the front and rear surfaces of the hopper. The screws may be locked in adjusted position by means of the nuts 37.

In operation it will be seen that the Macadamia or similar nuts 38 are fed downwardly from the hopper 27 to the recesses of the disk 20. Upon the rotation of the disk 20 the nuts disposed in each of the recesses in the disk are caused to engage the corresponding recess of the disk 19 as shown in Fig. 3 and as the disks approach the position shown in Fig. 4 the edges 26 of the knives 25 enter the shell 39 of the nut, causing it to split open in the manner shown in Fig. 7 without breaking the kernel 40. It will thus be appreciated that I have provided an improved nut cracking machine which is particularly suited for use in cracking Macadamia nuts and similar nuts having hard shells. It will be further appreciated that the machine is of relatively simple construction, having very few parts and which are of rugged construction, and as a result the machine may be used for many years with comparative freedom from breakage or wear.

It should be understood that in the accompanying drawings and in this specification I have described and illustrated one embodiment of my invention but that modifications may be made in the embodiment without departing from my invention as set forth in the accompanying claims.

I claim:

1. In a nut cracking machine a frame, a pair of spaced parallel shafts mounted for rotary movement on the frame, means for rotating the shafts in opposite directions at the same rate of speed, a pair of disks fixedly mounted on the shafts in the same vertical plane, each of the disks having a recess therein adapted to receive the nuts to be cracked, the recesses of the respective disks being in corresponding position so as to be in confronting relation during one period in each rotation of the disks, the space between the bases of the recesses when in confronting relation being less than the smallest diameter of the nuts to be cracked, and the disks being relatively thin so that the nuts to be cracked normally project beyond the sides of the disks, a hopper positioned above the disks and communicating with the periphery of one of the disks so as to supply the nuts to be cracked to the recesses in the disks and means for centering a nut in the said recesses comprising a pair of weighted members pivotally mounted on the hopper above the disks and depending downwardly so as to engage the front and rear faces thereof adjacent the point where the recesses come into confronting relation.

2. In a nut cracking machine a frame, a pair of spaced parallel shafts mounted for rotary movement on the frame, means for rotating the shafts in opposite directions at the same rate of speed, a pair of disks fixedly mounted on the shafts in the same vertical plane, each of the disks having a recess therein adapted to receive the nuts to be cracked, the recesses of the respective disks being in corresponding position so as to be in confronting relation during one period in each rotation of the disks and each of the disks being formed of a pair of parallel plates secured together and having radial slots on their confronting faces adjacent the recess and cutting knives positioned in the slots and projecting into the recesses, the cutting edges of the knives being concavely arcuate with the maximum distance between the knives and the respective disks when in confronting relation being less than the smallest diameter of the nuts to be cracked so that the cutting knives engage and crack the shell of the nut, the said disks being relatively thin so that the nuts to be cracked normally project beyond the sides of the disks, a hopper positioned above the disks and adapted to supply the nuts to be cracked to the recesses in the disks and means for centering a nut in the said recesses comprising a pair of weighted members pivotally mounted on the hopper above the disks and depending downwardly so as to engage the front and rear faces thereof adjacent the point where the recesses come into confronting relation.

ARTHUR FRANCIS ANDERSON.